United States Patent
Nuss

(10) Patent No.: US 12,263,770 B2
(45) Date of Patent: Apr. 1, 2025

(54) VEHICLE INTERIOR EQUIPMENT PART

(71) Applicant: GRAMMER AG, Ursensollen (DE)

(72) Inventor: Ralph Nuss, Poppenricht (DE)

(73) Assignee: GRAMMER AG, Ursensollen (DE)

( * ) Notice: Subject to any disclaimer, the term of this patent is extended or adjusted under 35 U.S.C. 154(b) by 135 days.

(21) Appl. No.: 18/197,252

(22) Filed: May 15, 2023

(65) Prior Publication Data

US 2024/0092241 A1 Mar. 21, 2024

(30) Foreign Application Priority Data

May 25, 2022 (DE) ...................... 10 2022 113 304.4

(51) Int. Cl.
*B60N 2/75* (2018.01)

(52) U.S. Cl.
CPC .............. *B60N 2/767* (2018.02); *B60N 2/793* (2018.02)

(58) Field of Classification Search
CPC ................................. B60N 2/767; B60N 2/793
See application file for complete search history.

(56) References Cited

U.S. PATENT DOCUMENTS

| | | | | |
|---|---|---|---|---|
| 2,150,715 A | * | 3/1939 | De Falco | F16D 41/063 192/45.1 |
| 5,702,157 A | * | 12/1997 | Hurite | B60N 2/767 297/411.32 |
| 6,050,645 A | * | 4/2000 | Bradbury | B60N 2/763 297/411.32 |
| 7,108,318 B2 | * | 9/2006 | Himmelhuber | B60N 2/767 297/411.32 |
| 8,480,177 B2 | * | 7/2013 | Kobayashi | B60N 2/767 297/411.32 |
| 8,550,505 B2 | * | 10/2013 | Nuss | B60N 2/767 292/300 |
| 8,702,174 B2 | * | 4/2014 | Pacolt | B60N 2/767 297/411.38 |
| 10,654,388 B2 | * | 5/2020 | Delger | B60N 2/753 |

FOREIGN PATENT DOCUMENTS

DE 102008023751 A1 11/2009

* cited by examiner

*Primary Examiner* — Philip F Gabler
(74) *Attorney, Agent, or Firm* — LUCAS & MERCANTI, LLP; Klaus P. Stoffel

(57) ABSTRACT

A vehicle equipment part having a base fixed to the bodywork and pivot part pivotable relative to the base about an axis, which pivot part can be locked in one pivot direction by a free-wheel device having a clamping member. The clamping member is arranged in a wedge-shaped clamping gap radially between a first counter-surface formed by a wedge structure fixed to the base and a circular cylindrical second counter-surface associated with the pivot part and is movable between a blocking position and a release position. The clamping member has a first contact surface, which faces the first counter-surface, and a second contact surface, which faces the second counter-surface. The second counter-surface is formed with a structure which is V-shaped in radial section and extends at least partly in the circumferential direction coaxially with the pivot axis and which is in the form of a recess or a projection, and the second contact surface is formed by a complementary structure.

14 Claims, 7 Drawing Sheets

VEHICLE INTERIOR EQUIPMENT PART

CROSS-REFERENCE TO RELATED APPLICATIONS

The present application claims priority of DE 10 2022 113 304.4, filed May 25, 2022, the priority of this application is hereby claimed and this application is incorporated herein by reference.

BACKGROUND OF THE INVENTION

The invention relates to a vehicle equipment part of the passenger compartment of a vehicle. Within the meaning of the invention, the term vehicle can mean a land vehicle, an aircraft or a watercraft.

DE 10 2008 023 751 A1 discloses a vehicle interior equipment part in the form of an armrest having a base and an arm support which is pivotable relative to the base. A wedge element having a plurality of wedge structures is connected for conjoint rotation with the pivot axle of the armrest. In a clamping gap between an outer surface of the wedge element and a cylindrical inner surface, formed coaxially with the pivot axle, of the armrest there are arranged a number of wedge-shaped clamping members corresponding to the number of wedge structures, which clamping members are movable between a clamping position and a release position. In the clamping position, a movement of the arm support in one pivot direction is stopped. In the release position, movement of the arm support is possible in both movement directions.

SUMMARY OF THE INVENTION

The object of the invention was to provide an arm support which provides improved locking of the arm support in the clamping position.

The invention relates to a vehicle equipment part of a vehicle interior having a base fixed to the bodywork and having a pivot part which is pivotable relative to the base about a pivot axis. The pivot part is, for example, a pivotable arm support of an armrest or, for example, a pivotable support of a center console.

The pivot part can be locked in respect of one pivot direction by means of a free-wheel comprising at least one clamping member. The clamping member is movable in a clamping gap between a clamping position and a release position. In the clamping position, the pivot part is locked in respect of one pivot direction. In the release position, the pivot part is movable in both pivot directions.

Each clamping member has at least one clamping formation and is arranged in the wedge-shaped clamping gap radially between a first counter-surface, which is provided with at least one wedge structure and is fixed to the base, and a convex or concave circular cylindrical second counter-surface associated with the pivot part. The clamping member is movable between a clamping position and a release position and has a first contact surface, which faces the first counter-surface, and a second contact surface, which faces the second counter-surface.

The second counter-surface is formed with at least one structure which is V-shaped in radial section and extends at least in some portions in the circumferential direction coaxially with the pivot axis and which is in the form of a projection and/or in the form of a recess. The second contact surface cooperating with the second counter-surface has a complementary structure.

Within the meaning of the invention, a V-shaped structure is to be understood as being a structure which has two opposite side surfaces tapering towards one another. The stump of surfaces arranged in a V-shape forms a V-shaped structure within the meaning of the invention. The opposite V-shaped surfaces must be able to move unhindered into contact with the complementary structure.

The advantage of these features is that, with the V-shaped structure, the surface normal force of the surfaces that are V-shaped in radial section is increased and the frictional force is increased. In this manner, the system can more easily and with greater reliability be so designed that self-locking is achieved. The demands on the friction behavior of the material of the second contact surface and second counter-surface are therefore lower. For example, the base material of the clamping member or of the pivot part having the features according to the invention can have sufficient friction properties for reliable functioning of the equipment part. For example, the V-shaped surface structures can be molded on. The friction properties can be influenced by varying the wedge angle of the V-shaped surfaces.

The at least one V-shaped structure of the second counter-surface is, for example, circumferentially annular.

At least one of the second contact surfaces and second counter-surfaces provided with the V-shaped structure or the complementary structure is formed, for example, by the base material of the clamping member or of the pivot part or by a material additionally applied to the clamping member or the pivot part. Within the meaning of the invention, the expression "applied material" is also to be understood as meaning a covering which forms the second contact surface and/or the second counter-surface.

The covering can, for example, be injection molded or mounted on the component in question. In this manner, the corresponding surface can be provided with particular features, while the member carrying the covering is formed, for example, by a different material. In the manner of a composite component, advantageous material properties can thus be provided despite comparatively low costs. For example, the braking properties and/or the compression strength can be influenced by the material of the covering.

For example, at least one wedge element, which is immovably fixedly connected to the base, comprises at least one wedge structure, which forms the first counter-surface. The at least one wedge element is, for example, non-rotatably arranged on an axis fixed to the base. The wedge element can have at least one wedge structure, wherein the wedge structures form the first counter-surface.

For example, a coaxial circular cylindrical structure is connected to the pivot part, the convex outer surface of which structure forms the second counter-surface. Alternatively, the pivot part is, for example, connected to a hollow cylinder which is formed coaxially with the pivot axis and the concave inner surface of which forms the second counter-surface.

For example, the V-shaped surface structures are formed in disc segments which are displaceable parallel to the pivot axis and which are mounted on the pivot part. Tolerance compensation and flush contact in the case of a plurality of wedge structures can thus be achieved. The disc segments are, for example, provided with axial play such that they can optimally move into engagement with the counter-structure. This reduces the demands on the tolerances.

The clamping member comprises, for example, at least one wedge-shaped wedge formation. For example, each clamping member is provided with two wedge formations. This reduces the outlay in terms of construction, because not every wedge formation in the form of its own clamping member and is separately releasable. The outlay in terms of production in respect of the clamping members and the outlay in terms of assembly are also reduced.

The first contact surface and the first counter-surface are, for example, of spiral form. In other words, a contact surface of the wedge structure of the clamping member has a radial coordinate which increases as the rotation angle around the pivot axis increases.

Each clamping member is loaded into the blocking position, for example, by a spring element. As soon as the clamping members are no longer moved into the release position by the release claws, they are loaded into the clamping position by the springs, so that the clamping members assume the clamping position again immediately after they have been released.

A coefficient of friction of, for example, between 0.1 and 0.2, in particular between 0.1 and 0.15, is formed between the second contact surface and the second counter-surface. This coefficient of friction is formed, for example, between a radial outer surface of the clamping members and the cylindrical inner surface of a hollow cylinder associated with the base or with the pivot part.

The wedge angle of the V-shaped structure is, for example, between 20° and 30°. These values result in a high frictional force without the risk of jamming. Alternative wedge angle values are likewise suitable, however.

For example, a release device is provided, by means of which the clamping member is movable into the release position.

The release device has at least one release claw which is movable between a passive position and an active position and with which at least one clamping member is moved into the release position.

The clamping member is movable—for example against spring force of at least one spring—by the release device from the clamping position into the release position. The release device allows the clamping members to be moved into the release position and held there. In the release position of the clamping members, a movement of the pivot part in both pivot directions is possible, without the occurrence of undesirable locking as a result of the clamping members automatically being moved into the clamping position.

The release claws move, for example, parallel to the pivot axis. For example, the release claws have sloping surfaces which can be brought into engagement with sloping surfaces of the clamping members in order to move the clamping member into the release position.

The release claw is associated, for example, with a release ring on which all the release claws are held, for example fastened or integrally formed. By moving the release ring, all the release claws can be moved together.

Each release claw separately or a release ring comprising all the release claws is loaded into the passive position, for example, by at least one spring.

A control device controls, for example, the movement of the release device between the blocking position and the release position. Control takes place, for example, in dependence on the angular position of the pivot part. In addition to the control device, the release device can be manually adjustable between the blocking position and the release position.

For example, an actuating device is provided, by means of which the release device is manually actuatable. The actuating device can be provided as the sole means of actuating the release device. Alternatively, both a manual actuating device and a control device can be provided.

The equipment part is, for example, an armrest or a console, and the pivot part is an arm support of the armrest or a pivotable support of the console.

Exemplary embodiments of the invention will be described by way of example in the following description of the figures, also with reference to the drawings. In the drawings, for the sake of clarity—also where different exemplary embodiments are concerned—identical or comparable parts or elements or regions are designated with identical reference signs, in some cases with the addition of lowercase letters.

Features which are described only in relation to one exemplary embodiment can also be provided within the scope of the invention in any other exemplary embodiment of the invention. Such modified exemplary embodiments—even if they are not shown in the drawings—are included in the invention.

All the disclosed features are in themselves essential to the invention. The disclosed content of the associated priority documents (copy of the preliminary application) and also of the cited publications and of the described devices of the prior art is hereby also incorporated in its entirety into the disclosure of the application, also for the purpose of incorporating individual or a plurality of features of these documents into one or into a plurality of the claims of the present application.

BRIEF DESCRIPTION OF THE DRAWING

In the drawings:

FIG. 6b shows a detail view according to detail line D in FIG. 6a.

DETAILED DESCRIPTION OF THE INVENTION

Figure 1:
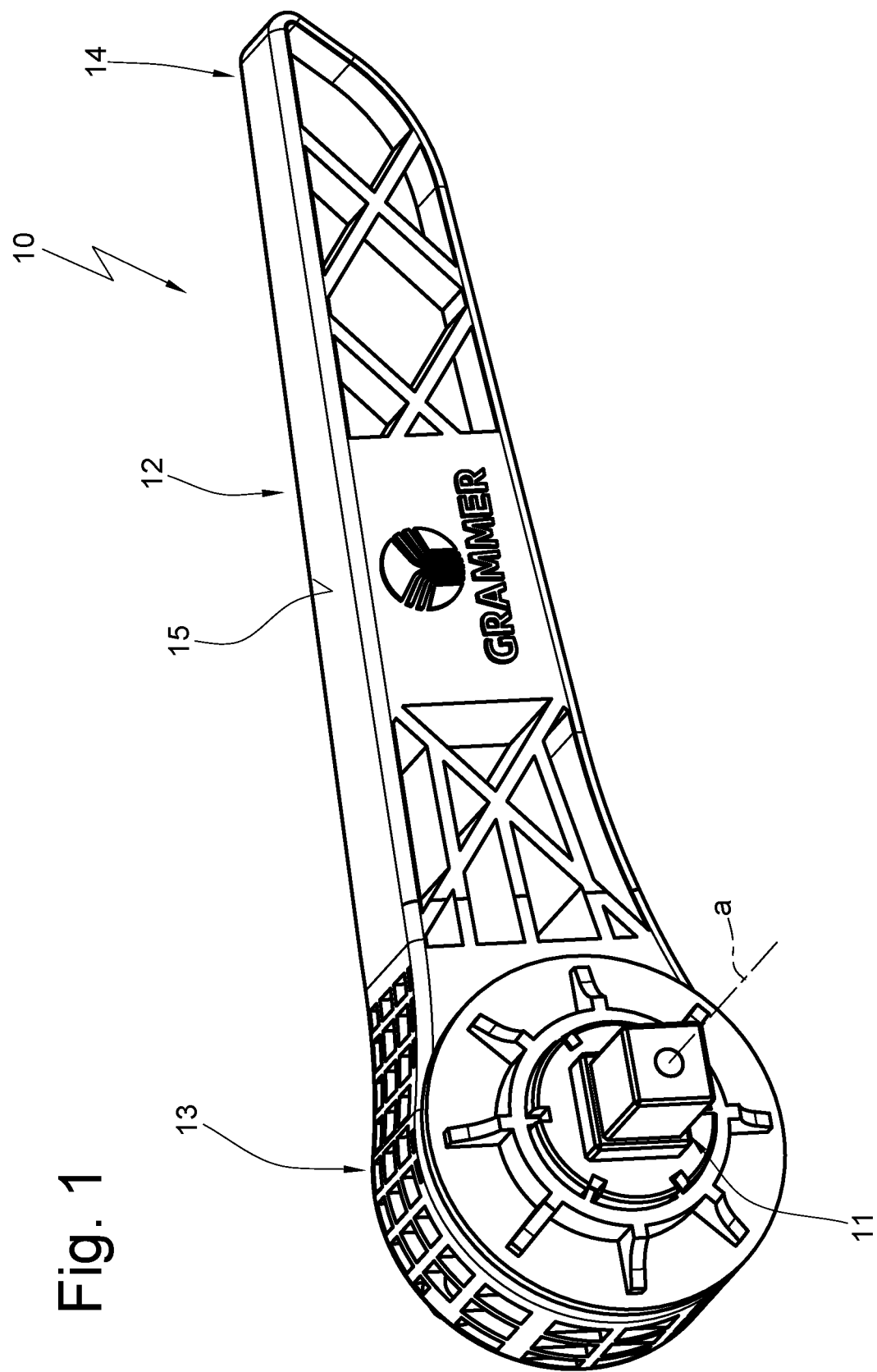
FIG. 1 shows a perspective view of a vehicle equipment part in the form of an armrest.
Figure 2:
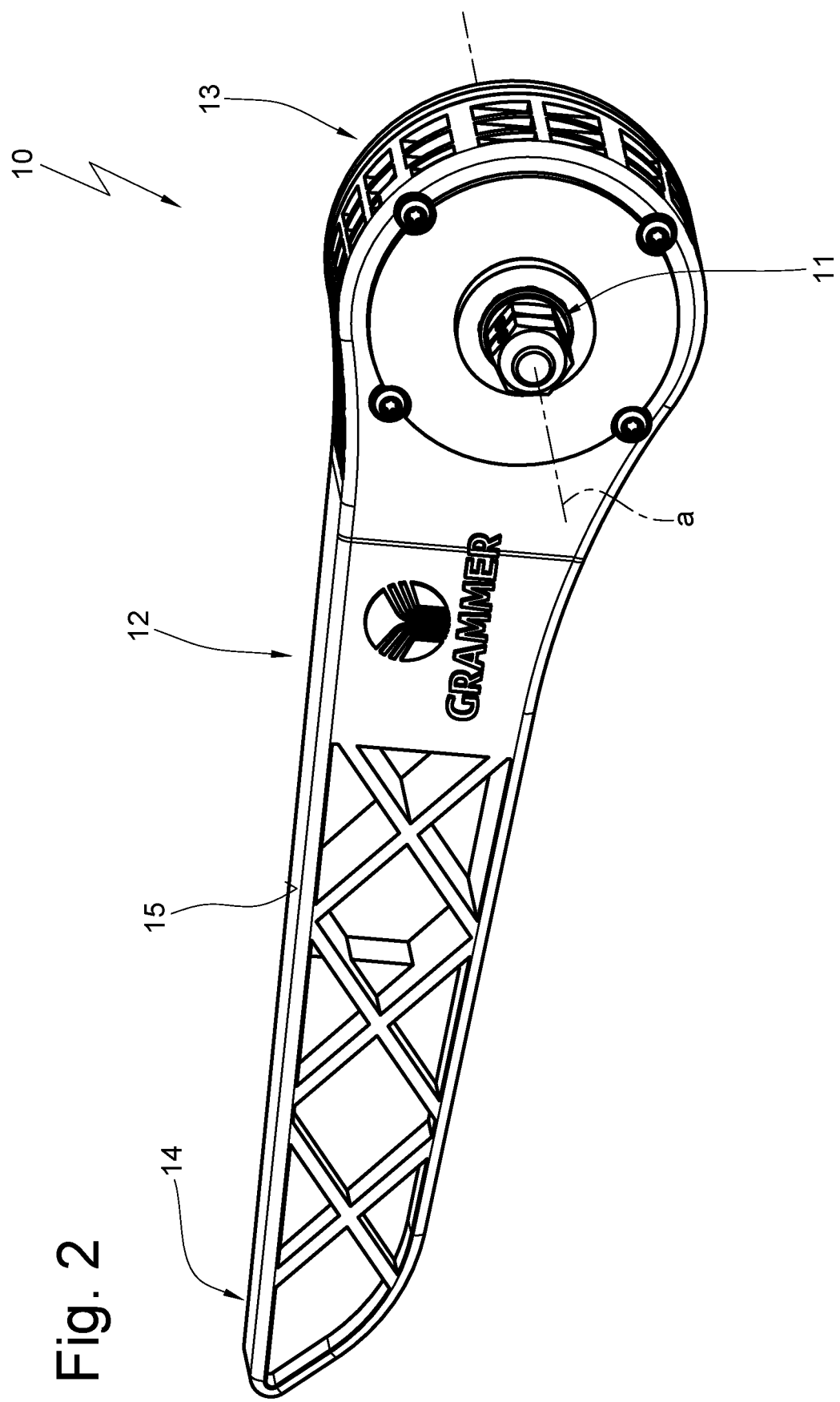
FIG. 2 shows a rear perspective view of the armrest.

FIGS. 1 to 4 show an equipment part 10 in the form of an armrest having a base 11 and a pivot part 12 in the form of an arm support which is pivotable about a geometric pivot axis a. In FIG. 1, a physical axis 16 of the base 11 can be seen, which is coaxial with the pivot axis a. The axis 16 is immovably fixedly connected to the base 11. The arm support 12 has an end region 13 close to the axis and a free end region 14. The arm support 12 is further provided with a support surface 15. A perspective view of the rear side of the armrest 10 is shown in FIG. 2.

Figure 3:
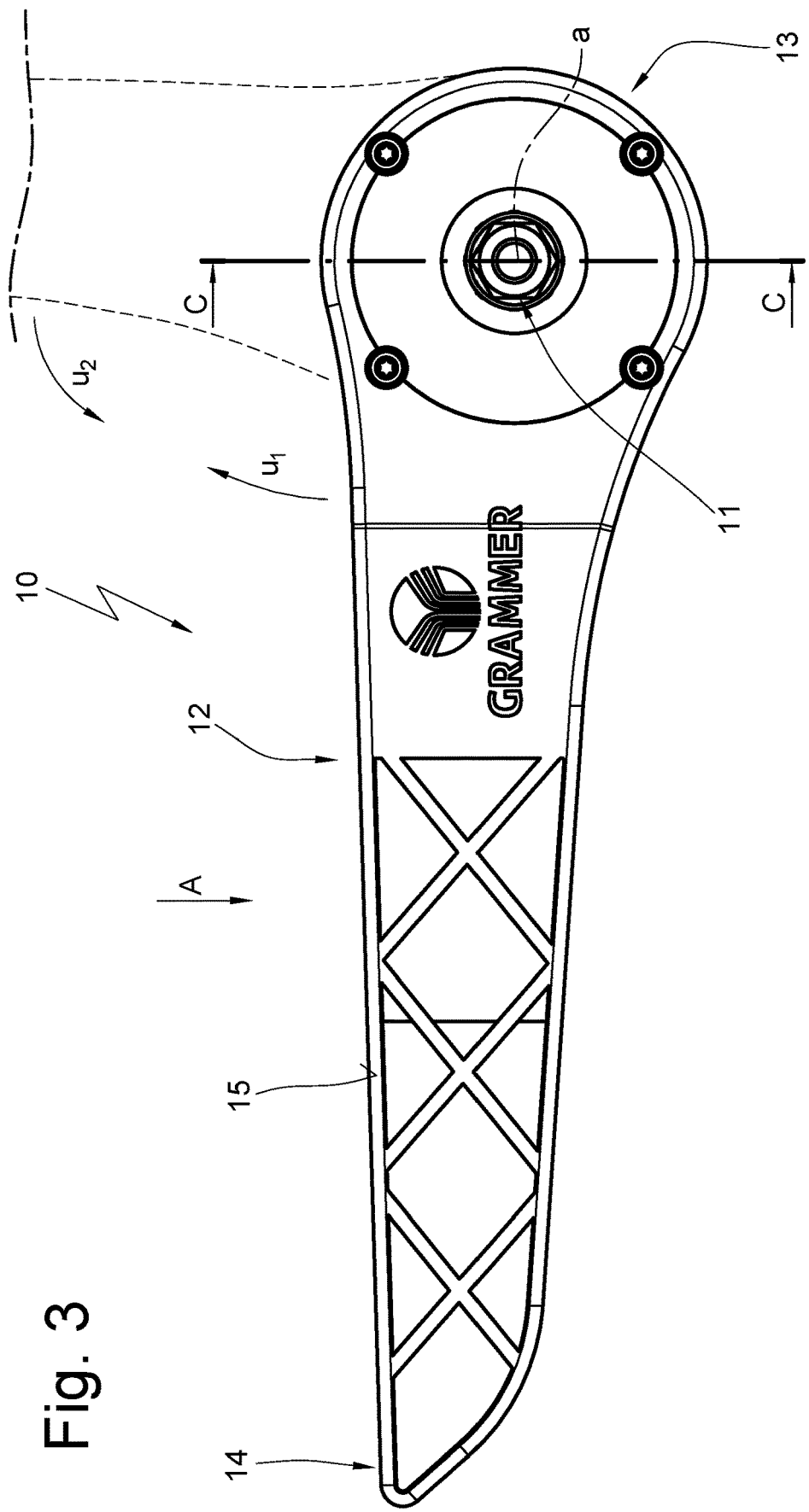
FIG. 3 shows a side view of the armrest.
Figure 4:
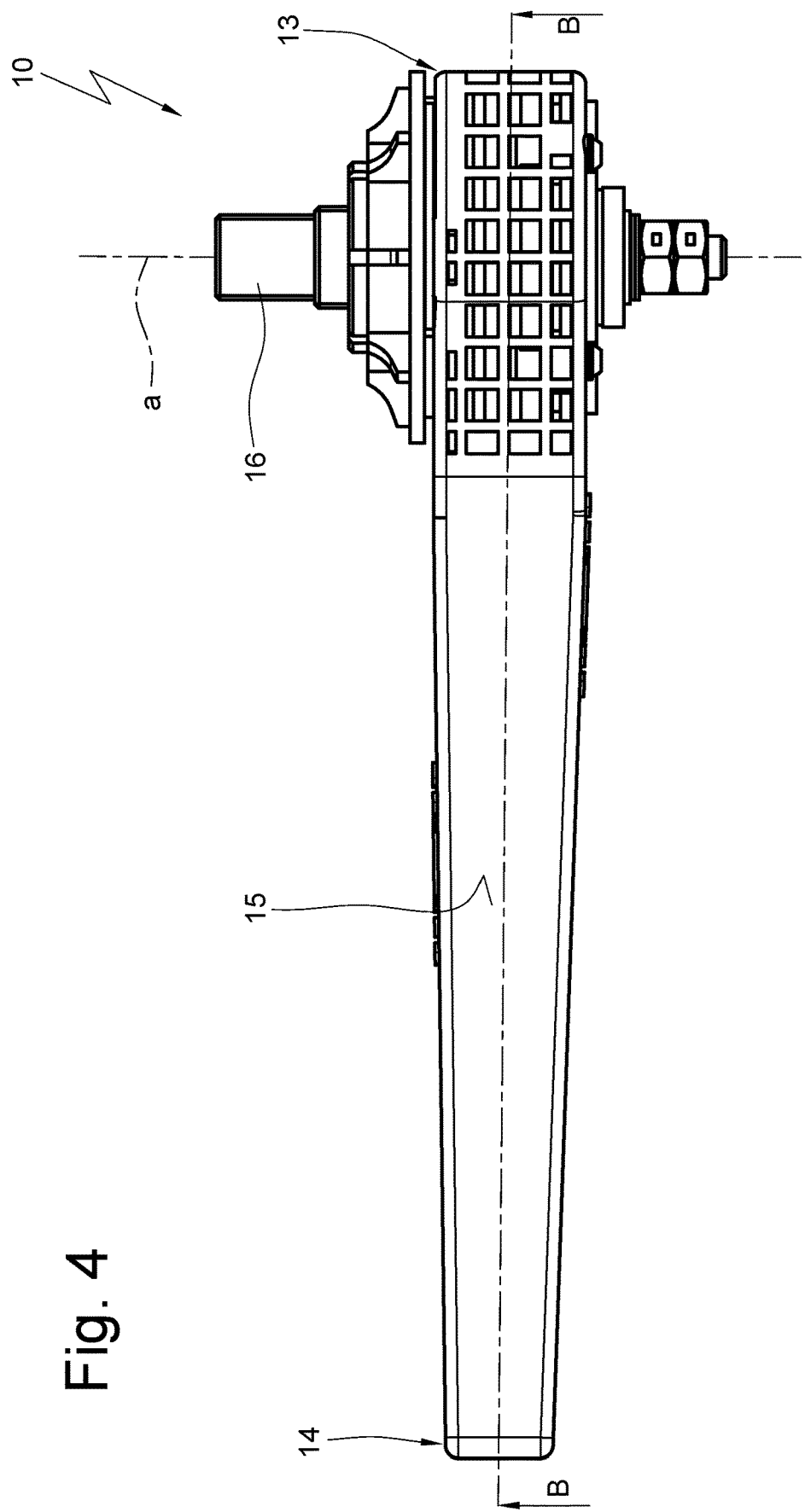
FIG. 4 shows a view according to view arrow A in FIG. 3.

From the position shown by a solid line in FIG. 3, the arm support 12 is pivotable in direction u1 into a position which is shown by a broken line in FIG. 3. From the position shown by a broken line, the arm support 12 can be pivoted in direction u2 into the position which is shown by a solid line in FIG. 3.

The arm support 12 is provided with a free-wheel device 20. This can be seen in FIGS. 5 and 6. For locking the arm support 12, a wedge element 17 is in positive engagement with the axis 16, so that rotation of the wedge element 17 in directions u1 and u2 is prevented. The wedge element 17 has a plurality of wedge-shaped wedge structures 18, which have first counter-surfaces 19 extending radially outwards in the form of a spiral.

In the present exemplary embodiment, the shaft wedge 17 has six wedge structures 18 distributed over the circumference. The wedge structures 18 are each equipped with first counter-surfaces 19. The number of wedge structures 18 is arbitrary and can differ from the number chosen here. Alternatively, 2, 3, 4 or 5 wedge structures 18, for example, can be present.

The arm support 12 forms at its end region 13 a hollow cylinder 21 with a circular cross-section, which is arranged coaxially with the axis 16. Between an inner surface 22 of the hollow cylinder 21 and the wedge element 17 there is formed a clamping gap 39, in which at least one clamping member 23 is movably arranged. An outer surface of the wedge element forms the first counter-surface 19, and the inner surface 22 forms the second counter-surface 44.

Each clamping member 23 comprises at least one wedge formation 41. In the present example, two wedge formations 41 are formed on each clamping member 23. At least one clamping member 23 can be arranged in the clamping gap 39. In particular, at least two, in the present example three, clamping members 23 are provided in the clamping gap 39.

The clamping member 23 is movable between a clamping position and a release position. In the clamping position according to FIG. 5, the arm support 12 is movable only in direction u1, while a movement in direction u2 is blocked. In the release position (not shown here), a movement of the arm support 12 in both directions u1 and u2 of the arm support 12 is possible.

A first contact surface 43 of each clamping member is in contact with the first counter-surface 19, and a second contact surface 27 is in contact with the second counter-surface 44.

Figure 5:
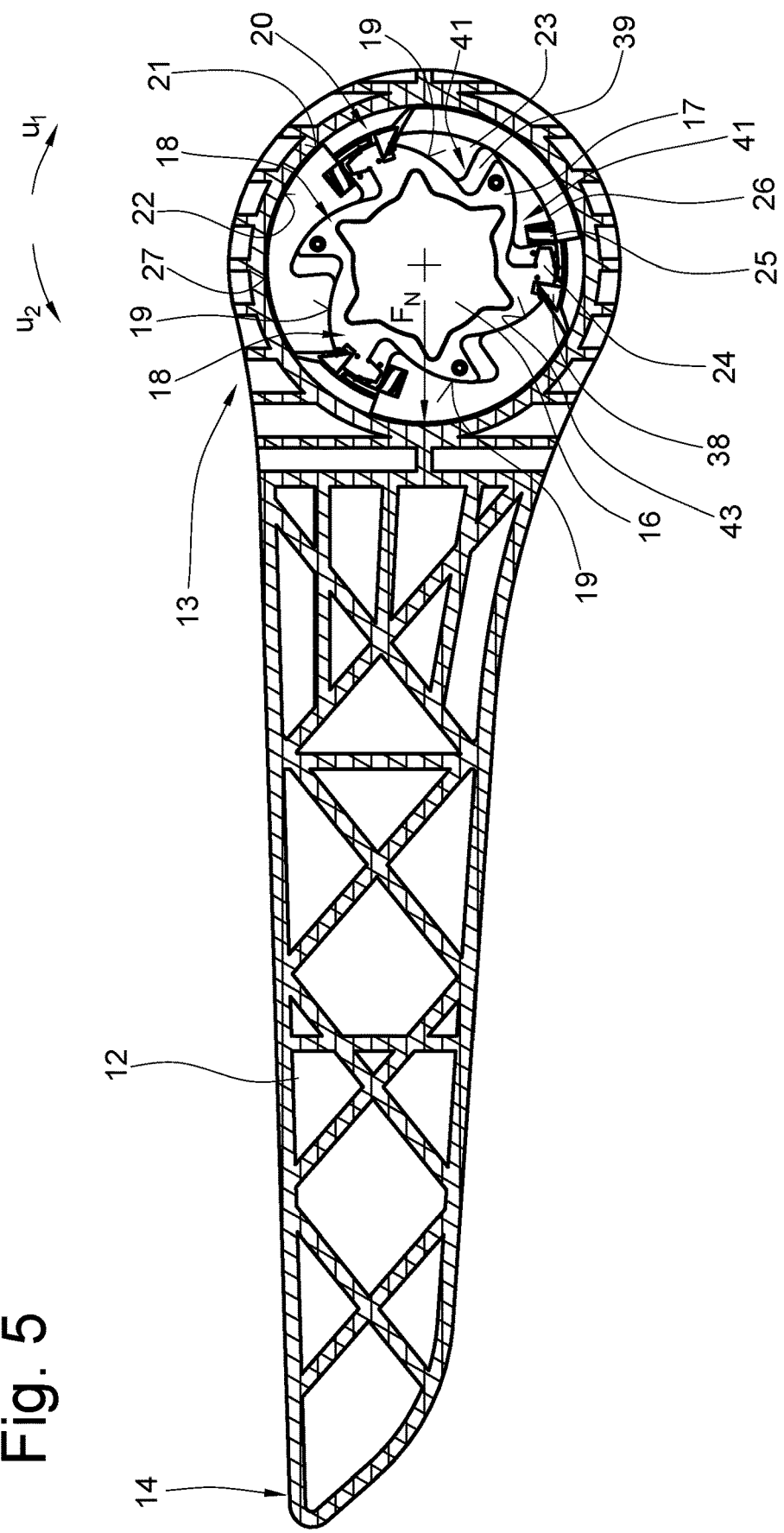
FIG. 5 shows a sectional view along section line B-B in FIG. 4.
Figure 6A:
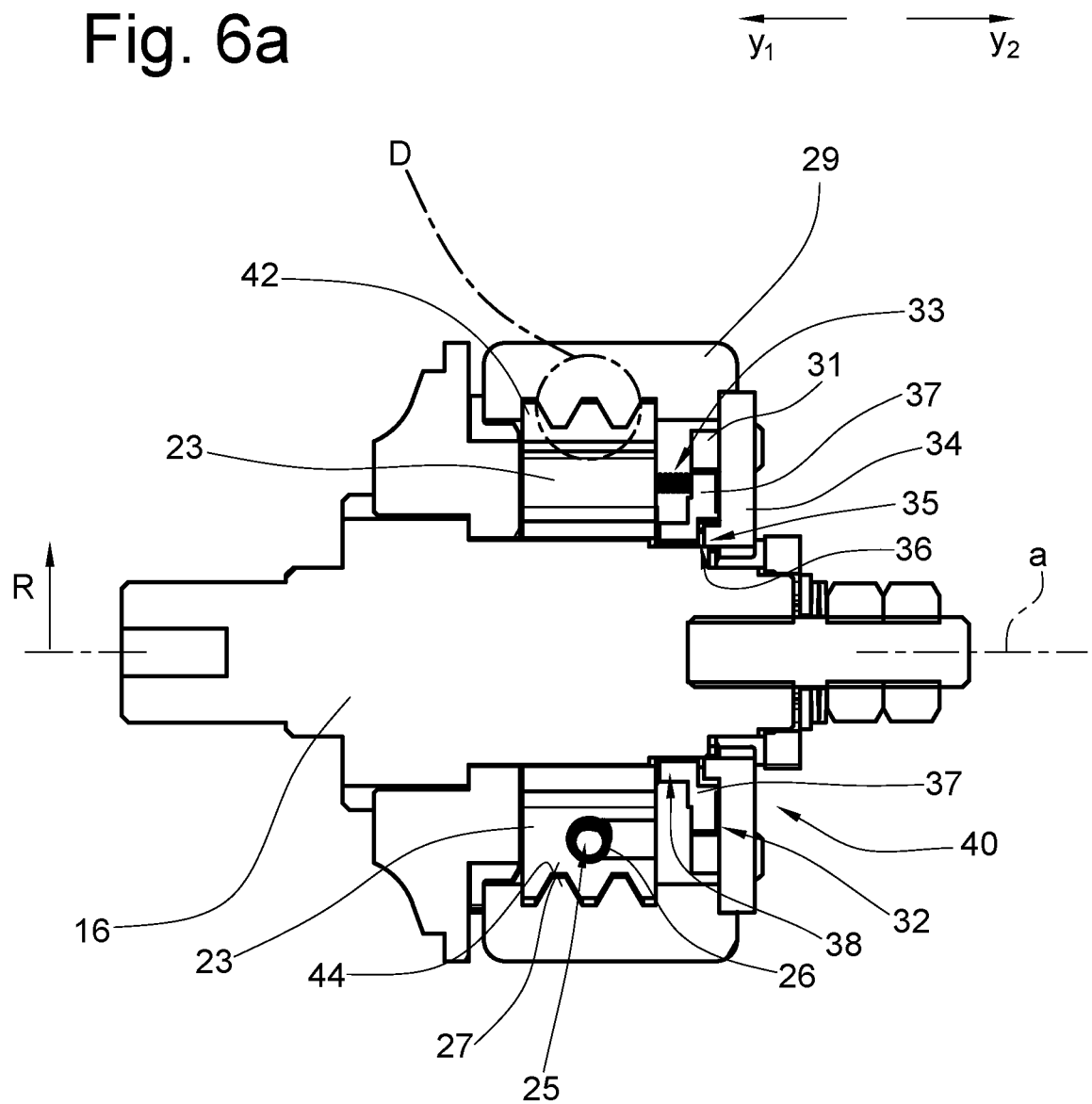
FIG. 6a shows a sectional view along section line C-C in FIG. 3.
Figure 6B:
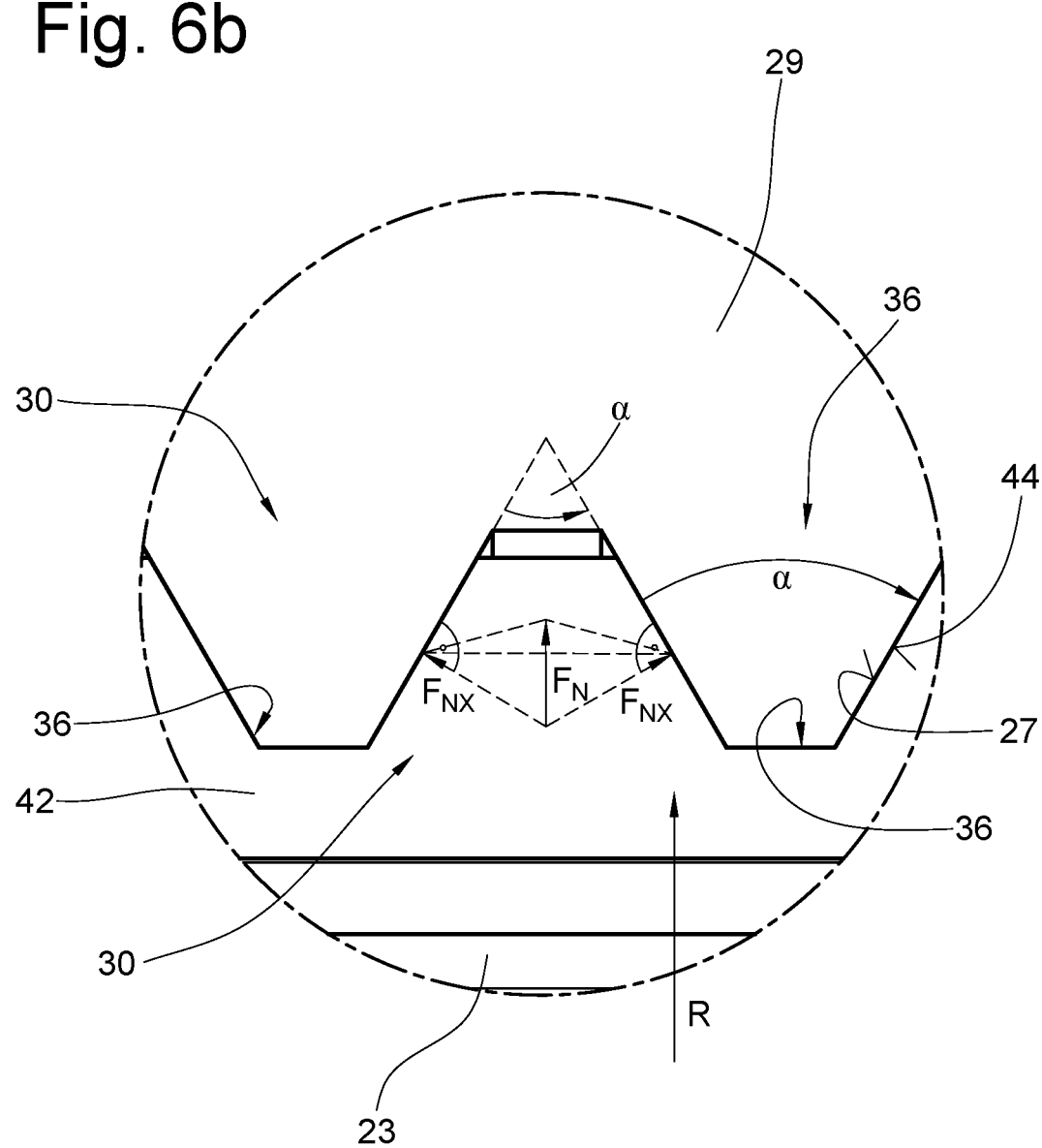

In the clamping position shown in FIG. 5, the clamping members 23 are in a clamping relationship with the first counter-surface 19 and with the second counter-surface 22. As a result of the clamping relationship, a normal force FN acting radially in direction R is exerted on the inner surface 22, which results in a frictional force which prevents movement of the arm support 12 relative to the axis 16.

Rotation of the release claws 23 in direction u1 from the clamping position into the release position reduces the normal force FN such that, as a result of the reduced frictional force, the arm support 12 is movable in both movement directions u1 and u2.

It can be seen in FIG. 5 that some of the wedge structures 18 of the wedge element 17 have a projection 24 protruding in the circumferential direction. The clamping member 23 forms a recess 25 which the projection 24 can enter on movement into the release position. In the recess 25 there is arranged a spring 26 which loads the clamping members 23 into the clamping position. The arrangement could of course be reversed.

The radially outwardly facing second contact surface 27 of the clamping member 23 is formed according to the invention by a friction lining 42 which is fixedly connected to the clamping member 23. At the inner surface 22 of the hollow cylinder 21, an insert is connected for conjoint rotation with a friction lining 29, which forms the second counter-surface 44 (see FIG. 6).

The second contact surface 27 and second counter-surface 44 facing one another are provided with V-shaped structures, namely with projections 30 and recesses 36, which are in engagement with one another. At the second counter-surface 44, the V-shaped structures extend in the form of a closed ring in the circumferential direction about the pivot axis a. At the second contact surface 27, the V-shaped structures extend in the circumferential direction over the entire clamping member.

Owing to the V-shape, a normal force FN acting radially in direction R (see FIG. 6) increases, so that the frictional force is increased. For example, the component forces FNX in the case of a wedge angle of 45° correspond to 1.3 FN. The increased normal force FN results in a higher frictional force. A substantially better locking action can therefore be obtained with the interengaging V-shaped surface structures of the friction lining 42 and of the friction lining 29.

The actuation of the free-wheel device 20 will be described hereinbelow. Actuation can in principle take place manually or automatically. In the present example, the movement of the free-wheel device 20 between the clamping position and the release position takes place by means of a control device 40. If the arm support 12 is pivoted from the position according to FIG. 5 in direction u1, the friction lining 29, which is rotationally connected to the arm support 12, likewise moves in direction u1. The friction lining 29 is associated with an insert, with which a cover plate 34, which has lugs 35, is connected for movement. The lugs 35 can rotate in a recess of a carrier 31 until they come into engagement with a stop surface.

On further rotation of the arm support 12 in direction u1, the lugs 35 rotate the carrier 31 in direction u1, wherein, by way of sloping surfaces (not shown), a claw ring 37, which is guided on the axis 16 so as to be movable in directions y1 and y2, of a release device 32 is moved in direction y1. The claw ring 37 is provided with release claws 38, which in an active position move the clamping members 23 in a manner not shown against the force of the springs 26 in direction u1 into a release position. The arm support 12 is then freely movable in directions u1 and u2. The carrier ring 31 holds the claw ring 37 in the active position (not shown), which is loaded by spring elements 33, which bear against the wedge element 17, in direction y2 into the passive position shown in FIG. 6a.

For reversing the free-wheel device 20, the free-wheel device is pivoted in direction u2 until the carrier ring releases the claw ring 37 and the claw ring 37 is caused by the springs 33 to move back in direction y2 into the passive position. The clamping members 23 are then no longer held in the release position by the release claws 38 and are therefore moved by the springs 26 into the clamping position.

The configuration of the control device 40 is not important in the invention. It could alternatively also be configured differently.

According to an alternative or in addition, release can take place by way of a manual actuating device.

The invention claimed is:

1. A vehicle equipment part of a vehicle interior, comprising: a base fixable to bodywork of the vehicle interior; a pivot part pivotable relative to the base about a pivot axis, the pivot part being lockable relative to one pivot direction; and a free-wheel device that locks the pivot part, the free-wheel device including at least one clamping member, wherein the clamping member is arranged in a wedge-shaped clamping gap radially between a first counter-surface formed by at least one wedge structure fixed to the base and a convex or concave circular cylindrical second counter-surface associated with the pivot part, and is movable between a blocking position and a release position, wherein the at least one clamping member has a first contact surface that faces the first counter-surface, and a second contact surface that faces the second counter-surface, wherein the second counter-surface is formed with at least one structure that is V-shaped in radial section and extends at least in some portions in a circumferential direction coaxially with the pivot axis and that is formed as a recess or a projection, and wherein the second contact surface is formed as a complementary structure to the second counter-surface.

2. The vehicle equipment part according to claim 1, wherein the V-shaped structure of the second counter-surface is formed circumferentially annularly around the pivot axis.

3. The vehicle equipment part according to claim 1, further comprising at least one wedge element that is immovably fixedly connected to the base and comprises the at least one wedge structure that forms the first counter-surface.

4. The vehicle equipment part according to claim 1, further comprising a coaxial circular cylindrical structure connected to the pivot part and having a convex outer surface that forms the second counter-surface.

5. The vehicle equipment part according to claim 1, further comprising a hollow cylinder formed coaxially with the pivot axis and having a concave inner surface that forms the second counter-surface, the pivot part being connected to the hollow cylinder.

6. The vehicle equipment part according to claim 1, wherein the clamping member comprises at least one wedge-shaped wedge formation.

7. The vehicle equipment part according to claim 1, wherein the first contact surface and the first counter-surface are of spiral form.

8. The vehicle equipment part according to claim 1, further comprising a spring arranged to load the at least one clamping member into the blocking position.

9. The vehicle equipment part according to claim 1, further comprising a release device arranged to move the clamping member into the release position.

10. The vehicle equipment part according to claim 9, wherein the release device includes at least one release claw that is movable between a passive position and an active position, and, in the active position, the at least one clamping member is moved into the release position.

11. The vehicle equipment part according to claim 10, further comprising a spring arranged to load the release device into the passive position.

12. The vehicle equipment part according to claim 10, further comprising an actuating device configured to manually actuate the release device.

13. The vehicle equipment part according to claim 9, further comprising a control device configured to move the release device between the blocking position and the release position in dependence on an angular position of the pivot part.

14. The vehicle equipment part according to claim 1, wherein the vehicle equipment part is an armrest or a center console, and wherein the pivot part is a pivotable arm support.

* * * * *